March 24, 1964   C. E. PAULES   3,126,054
JACKETED DOUGH MIXER

Filed July 14, 1961   3 Sheets-Sheet 1

INVENTOR.
CLAIR E. PAULES
BY
Otto Moeller
Attorney

March 24, 1964 C. E. PAULES 3,126,054
JACKETED DOUGH MIXER

Filed July 14, 1961 3 Sheets-Sheet 2

INVENTOR.
CLAIR E. PAULES
BY
Otto Moeller
Attorney

March 24, 1964 C. E. PAULES 3,126,054
JACKETED DOUGH MIXER

Filed July 14, 1961 3 Sheets-Sheet 3

INVENTOR.
CLAIR E. PAULES
BY
Otto Moeller
Attorney

United States Patent Office 3,126,054
Patented Mar. 24, 1964

3,126,054
JACKETED DOUGH MIXER
Clair E. Paules, Red Lion, Pa., assignor, by mesne assignments, to Baker Perkins Inc., New York, N.Y., a corporation of New York
Filed July 14, 1961, Ser. No. 124,208
5 Claims. (Cl. 165—109)

My invention relates to dough mixers and more particularly to horizontal commercial dough mixers of the tilting bowl type provided with a coolant circulating jacket.

In the mixing of dough in such mixers, frictional heat is generated by the mechanical agitation and heat is also developed by the action of the yeast on the dough, which if not dissipated is harmful to the quality of the dough. It is therefore essential to provide for a continuous circulation of a coolant fluid between a refrigerating system and the coolant fluid circulating jacket of the mixing bowl of the mixer. Coolant fluid supply and return line systems for the jacket of a mixing bowl that is rotatably supported between a pair of upright standards for tilting movement between a normal mixing position and a tilted dough discharge position, have not been entirely satisfactory in the past.

It is an object of the invention to provide a coolant fluid supply and return line system for a mixer of the above type that eliminates all movable hoses or swing joints exteriorly of the mixer.

A further object of the invention is to provide a coolant fluid supply and return line system for a mixer of the above type wherein the extensible flexible portion thereof to compensate for tilting movement of the mixing bowl is wholly disposed within a hollow standard of the mixer, and wherein the portions of the coolant fluid supply and return lines in the space between the standard and the jacket of the tiltably supported mixing bowl move as a unit with the mixing bowl, eliminating in this space any relatively movable line portions with consequent elimination of extensible hose connections or swing joints.

Other objects and advantages will be apparent from the following detailed description of a preferred embodiment of the invention, reference being had to the accompanying drawings, in which.

Figure 1:
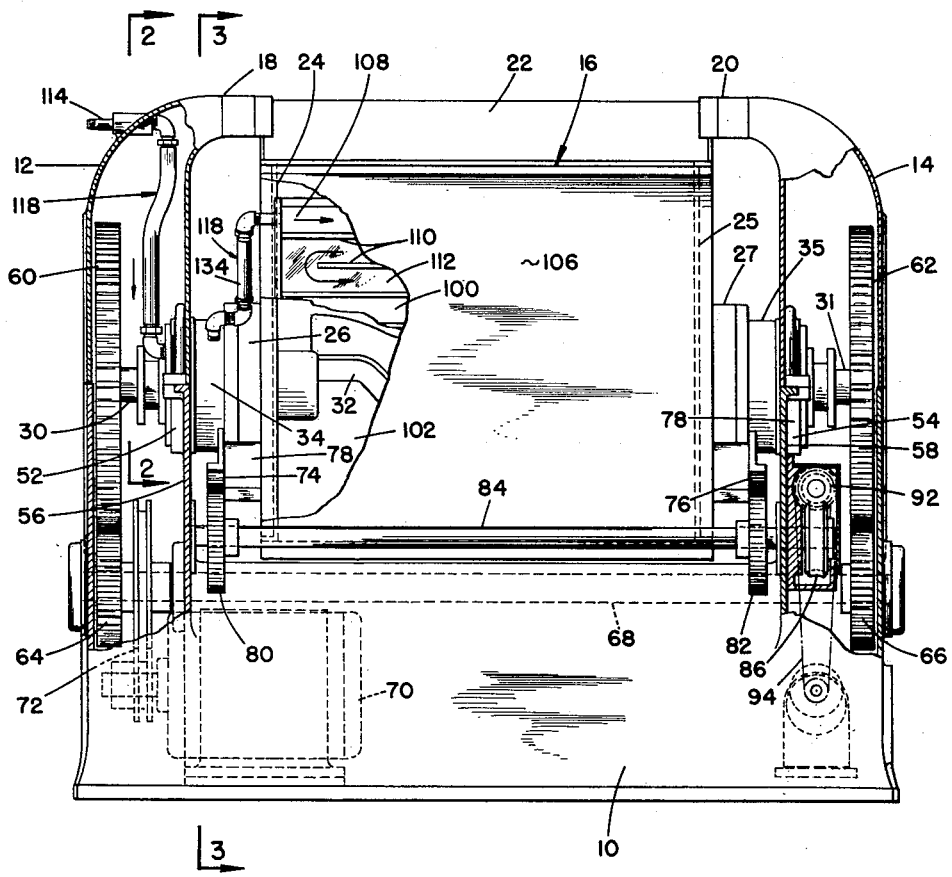
FIGURE 1 is a rear end elevation, with parts broken away and shown in section, of a dough mixing machine embodying the present invention.
Figure 2:
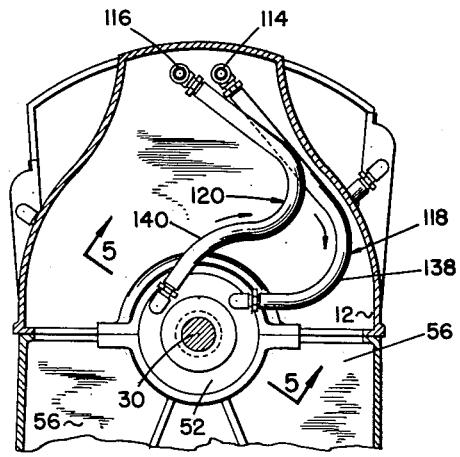
FIGURE 2 is a sectional view taken on line 2—2 of FIGURE 1.
Figure 3:
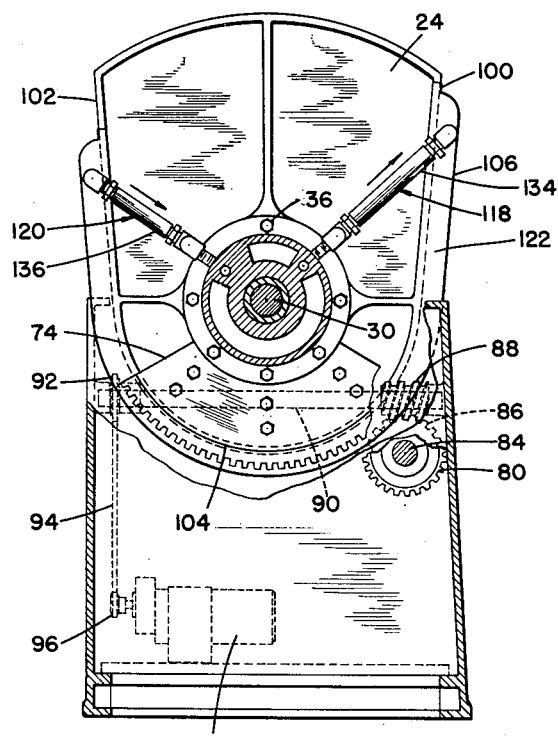
FIGURE 3 is a sectional view taken on line 3—3 of FIGURE 1 with parts broken away.

Referring to the drawings, and particularly to FIGURE 1, the horizontal dough mixer comprises a casing having a hollow base 10 and hollow upright standards 12 and 14 at opposite ends of the base 10. Between the standards 12 and 14 and above the base 10 is a mixing bowl 16, mounted to be tilted from its normal mixing position, as shown in FIGURES 1, 2 and 3, to a position, as shown in FIGURE 4, in which the dough may be removed from the mixing bowl.

Figure 4:
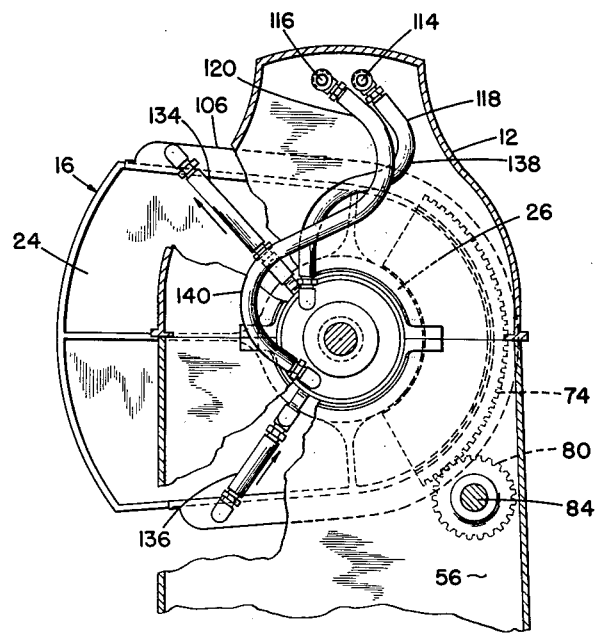
FIGURE 4 is a sectional view taken on the same line of FIGURE 1 as FIGURE 2, but with parts broken away and the mixing bowl shown in its tilted position.
Figure 6:
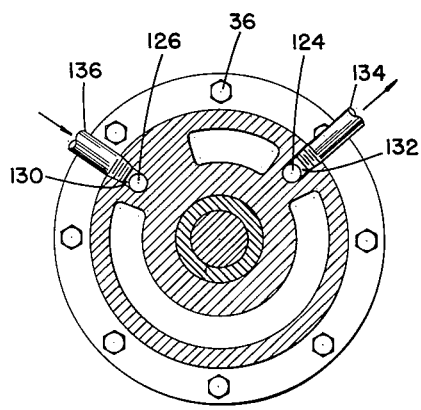
FIGURE 6 is a sectional view taken on line 6—6 of FIGURE 5.

As may best be seen by referring to FIGURES 1 and 4, the upper ends of the standards 12 and 14 are tapered and terminate in projections 18 and 20 curving inwardly toward one another. Suitably secured to and extending between the projections 18 and 20 is an arcuately formed plate 22 arranged to form a cover over the open upper end of the mixing bowl 16 when the latter is in its normal mixing position.

Figure 5:
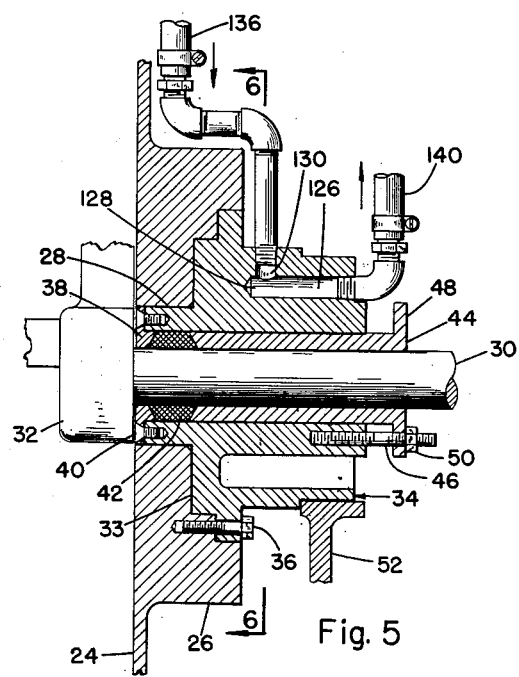
FIGURE 5 is a sectional view taken on line 5—5 of FIGURE 2.

In order to rotatably mount the bowl 16 for tilting movement as aforesaid, the end walls 24 and 25 of the bowl 16 are formed with the bosses 26 and 27. Referring more particularly to FIGURE 5, the boss 26 is provided with a step shaped opening 28 of substantially larger diameter than the diameter of the shaft 30 of the agitator 32 so that the shaft 30 passes freely through the opening 28. The boss 27 is similarly formed to permit passage therethrough of the shaft 31 at the right hand side of the mixer as viewed in FIGURE 1.

Referring again particularly to FIGURE 5, a step shaped inner centering hub portion 33 of the trunnion 34 fits closely within the complementary step shaped opening 28 in the boss 26, and bolts 36 extending through centering hub portion 33 and threaded into the boss 26 rigidly secures the trunnion 34 to the boss 26. The trunnion 35 at the right hand side of the mixer as viewed in FIGURE 1, is similarly constructed and secured in similar manner to the boss 27.

The trunnion 34 has a bore of larger diameter than the diameter of the shaft 30 to accommodate sealing means therebetween, including a bushing 38 secured to the inner end of the centering hub 32 of the trunnion 34 by means of flat head screws 40. Packing 42 is compressed against the bushing 38 by packing gland 44 in such manner as to form a fluid tight joint between it and the shaft 30. Bolts, one of which is shown at 46, extend through the peripheral flange 48 of the packing gland 44 and are threaded into the trunnion 34, and nuts 50 threaded on the projecting ends of bolts 46 when screwed down against the peripheral flange 48, force the packing gland 44 in engagement with the packing 42. It is understood that a similar sealing arrangement is provided at the other end of the mixer between trunnion 35 and shaft 31.

The outer end portions of the trunnions 34 and 35 are journaled in bearings 52 and 54, the lower semi-circular portions of which are preferably integrally formed with the inner walls 56 and 58 of the standards 12 and 14, and the semi-circular upper portions of which are formed as separate cap members suitably secured to the lower semi-circular portions.

To provide for rotation of the agitator 32 in the bowl 16, the portions of the shafts 30 and 31 in the standards 12 and 14 and beyond the bearings 52 and 54 have large gears 60 and 62 mounted thereon. Gears 60 and 62 mesh with smaller gears 64 and 66 mounted on the ends of a shaft 68 extending through the base 10 and journaled in suitable bearings carried by the inner and outer walls of the standards 12 and 14. Shaft 68 is driven from a motor 70 mounted in the base 10 through suitable means, as by belt and pulley means designated as a whole by reference numeral 72.

The means for tilting the bowl 16 includes arcuate segmental racks 74 and 76 concentric with the tilting axis of the bowl on its trunnions 34 and 35. The racks 74 and 76 are secured to lugs 78 formed with and extending outwardly of the end walls 24 and 25 of the bowl 16 and also formed with and extending radially of the lower peripheral surface of the end wall bosses 26 and 27, as best shown in FIGURES 1 and 3. Meshing with the racks 74 and 76 are pinions 80 and 82 fixed on a horizontal shaft 84 extending along the lower front side of the bowl 16 and journaled in suitable bearings carried by the inner walls 56 and 58 of the standards 12 and 14. The right hand end of the shaft 84, as viewed in FIGURE 1, projects through the wall 58 into the standard 14, on which projecting end of shaft 84 is fixed a worm gear 86. Worm gear 86 meshes with a worm 88 fixed on one end of a horizontal shaft 90 disposed within the standard 14 at right angles with respect to shaft 84. The ends of the shaft 90 are journaled in suitable bearings carried by the front and rear walls of the standard 14. On the forward end of the shaft 90 opposite the worm 88 is fixed a sprocket 92, connected by a chain 94 with a sprocket 96 fixed on the shaft of a gearhead motor 98 mounted in the lower right hand front part of the base 10. The means above described provides for tilting of the bowl 16 between the position shown in FIGURE 3 and the position shown in FIGURE 4.

The front and rear walls 100 and 102 of the bowl 16, substantially throughout their areas, and the curved bottom 104, are covered by a jacket 106 defining a chamber 108 for circulation therethrough of a coolant fluid. In the mixing of dough, heat is developed, both by reason of friction of the dough mass against the walls of the mixer and by the action of the yeast on the dough. Such heat if uncontrolled has a deleterious effect on the dough, and it is therefore important to provide effective cooling means to maintain the temperature of the dough within prescribed limits.

To provide such effective cooling, it is customary to provide in the chamber 108 a serpentine path for the flow of the coolant fluid. This is accomplished by providing in the chamber 108 a series of equidistantly spaced horizontal partitions 110. In well known manner, one group of alternate partitions extend from one end wall of the chamber 108 to a point short of the opposite end wall of the chamber, while the other group of alternate partitions extend from the said opposite end wall of the chamber to a point short of the said one end wall thereof, to thereby provide a continuous passage 112 for flow of coolant fluid back and forth, downwardly from the upper end of one side wall of the bowl 16, around the arcuate bottom wall of the bowl 16, and then upwardly to the upper end of the other side wall of the bowl 16.

The mixer is provided with a novel and improved construction and arrangement of elements for the passage of coolant fluid from and to the tiltable bowl 16, as hereinafter described in detail.

Extending through the tapered upper portion of the outer end wall of the standard 12 are a pair of side by side pipe nipples 114 and 116. A suitable refrigerating system of conventional type disposed exteriorly of the mixer is provided, from which coolant fluid is piped to the inlet pipe nipple 114 and to which expended coolant fluid is returned from the outlet pipe nipple 116. Such refrigerating systems are well known in the art and since the particular construction thereof does not constitute a part of the present invention, it has not been shown in the drawings.

The mixer is provided with a coolant fluid intake line, designated as a whole by reference numeral 118, connecting the inlet pipe nipple 114 with the extreme upper end of the coolant chamber 108 at the back of the mixer, and is further provided with a coolant fluid return line, designated as a whole by reference numeral 120, connecting the outlet pipe nipple 116 with the extreme upper end of the coolant chamber 108 at the front of the mixer. Communication of the lines 118 and 120 with the chamber 108 as aforesaid, is established through the end wall 122 of the jacket 106, as best shown in FIGURE 3.

The coolant fluid is introduced into the chamber 108 on that side of the mixer toward which the agitator throws the dough, which in the present instance is the back of the mixer, since it is on the side of the mixer against which the dough is thrown that the greatest amount of frictional heat is developed and on which side the greatest amount of heat exchange is desired.

A portion of the intake and return lines 118 and 120 are formed in the trunnion 34 and include the intake and return passages 124 and 126 in parallelism with but radially offset from the axis of rotation of the trunnion 34. As best shown in FIGURE 5, the return passage 126 opens through the outer end of the trunnion 34 into the standard 12, and extends into the trunnion 34 a distance beyond the plane of the inner wall 56 of the standard 12. At the closed end 128 of the passage 126 there is provided a radially extending port 130 which opens into the space between the end wall 24 of the mixing bowl 16 and the inner wall 56 of the standard 12. It is understood that the inlet passage 124 and its radial port 132 are similarly formed.

The intake and return lines 118 and 120 also include intake and return conduit sections 134 and 136. Intake conduit section 134 connects the port 132 with the upper end of chamber 108 at the back of the mixer and return conduit section connects the port 130 with the upper end of chamber 108 at the front of the mixer.

The trunnion 34, as previously described, is rigidly secured to the boss 26 of the mixing bowl 16, so that when the bowl 16 is tilted between the two positions shown in FIGURES 3 and 4, the trunnion 34 and the bowl 16 rotate as a unit, consequently the conduit sections 134 and 136 also move as a unit with the trunnion and bowl. Thus the conduit sections 134 and 136 may be of minimum length, in other words, no extra length of flexible conduit is necessary in the space between the standard 12 and bowl 16 to compensate for tilting movement of the bowl 16, and relative movement between these sections of lines 118 and 120 and the bowl 16 is eliminated.

The intake and return lines 118 and 120 further include intake and return conduit sections 138 and 140. Intake conduit section 138 connects the inlet pipe nipple 114 with the outer end of trunnion passage 124 and return conduit section 140 connects the outlet pipe nipple 116 with the outer end of trunnion passage 126. Intake and return conduit sections 138 and 140 are, except for the elbows adjacent the pipe nipples and the trunnion 34, formed of flexible hose to accommodate tilting movement of the bowl 16. Thus, exteriorly of the mixer any type of movable conduit or hose between the source of coolant fluid and the mixer is entirely eliminated, along with the hazards and inconvenience such movable conduits or hoses present. Also, in the space between the standard 12 and the mixer jacket, looped flexible hose portions to accommodate tilting of the bowl 16 are eliminated, with consequent elimination of kinking of such hose portions and movement of such hose portions relative to the bowl 16 during tilting movement thereof. It will be seen, therefore, that the only conduit or hose portions relatively movable with respect to any part of the mixer are entirely enclosed within the standard 12. It is also apparent that since the movable ends of the flexible hose portions 138 and 140 are connected to the trunnion 34 relatively close to the tilting axis of the bowl, swinging movement of the flexible hose portions of the coolant fluid lines 118 and 120 to accommodate tilting of the bowl 16 is minimized, whereby kinking of the flexible hose portions can be eliminated while employing minimum lengths of flexible hose.

I claim:

1. In a dough mixer, a pair of spaced hollow upright standards, a trough shaped mixing bowl between and in spaced relation with respect to said standards, a coolant fluid circulating jacket encompassing the side and bottom walls of said mixing bowl, means for tiltably mounting said mixing bowl including a trunnion rigidly secured to an end wall of said mixing bowl and rotatably mounted in the adjacent standard, coolant fluid supply and return lines for said jacket including supply and return passages in said trunnion opening at one end into said standard and at the other end into the space between said standard and said mixing bowl, flexible extensible supply and return conduit sections disposed wholly within said standard, each having at one end a connection with and opening through an exterior wall of said standard and having at the other end a connection with a respective trunnion passage, and inextensible supply and return conduit sections disposed wholly in the space between said standard and said mixing bowl end wall connecting said trunnion passages with said coolant fluid circulating jacket.

2. In a dough mixer, a pair of spaced hollow upright standards, a trough shaped mixing bowl between and in spaced relation with respect to said standards, a coolant fluid circulating jacket encompassing the side and bottom walls of said mixing bowl, means for tiltably mounting said mixing bowl including a trunnion rigidly secured to an end wall of said mixing bowl and rotatably mounted in the adjacent standard, coolant fluid supply and return lines for said jacket including supply and return passages in said trunnion opening at one end into said standard and at the other end into the space between said standard and said mixing bowl, flexible supply and return conduit sections disposed wholly within said standard, each having at one end a connection with and opening through an exterior wall of said standard and having at the other end a connection with a respective trunnion passage, said flexible conduit sections being of a length to permit the ends thereof connected to said trunnion to rotate with said trunnion upon tilting of said mixing bowl, and supply and return conduit sections disposed wholly in the space between said standard and said trunnion passages with said coolant fluid circulating jacket.

3. In a dough mixer, a pair of spaced hollow upright standards, a trough shaped mixing bowl disposed between said standards with the end walls thereof in spaced relation with respect to the adjacent end walls of said standards, a coolant fluid circulating jacket encompassing the side and bottom walls of said mixing bowl, means for tiltably mounting said mixing bowl between said standards including a trunnion rigidly secured to an end wall of said mixing bowl rotatably mounted in the adjacent end wall of one of said standards, coolant fluid supply and return lines connecting said jacket with a coolant fluid refrigerating system including supply and return passages in said trunnion opening at one end into said standard and at the other end into the space between said standard and said mixing bowl, supply and return conduit sections wholly disposed within said standard connected at one end with and opening through an exterior wall of said standard and connected at the other end with said trunnion passages, said conduit sections having flexible portions of a length to permit said last named ends of said conduit sections to rotate with said trunnion upon tilting of said mixing bowl, and supply and return conduit sections wholly disposed in the space between said standard and said mixing bowl connecting said trunnion passages with said coolant fluid circulating jacket, said last named conduit sections being movable as a unit with but fixed against relative movement with respect to said trunnion and mixing bowl upon tilting of said mixing bowl.

4. In a dough mixer, a pair of spaced hollow upright standards, a trough shaped mixing bowl between and in spaced relation with respect to said standards, a coolant fluid cirulating jacket encompassing the side and bottom walls of said mixing bowl, means for tiltably mounting said mixing bowl including a trunnion rigidly secured to an end wall of said mixing bowl and rotatably mounted in the adjacent standard, coolant fluid supply and return lines for said jacket including supply and return passages in said trunnion opening at one end into said standard and at the other end into the space between said standard and said mixing bowl, flexible supply and return conduit sections disposed wholly within said standard, each having at one end a connection with and opening through an exterior wall of said standard and having at the other a connection with a respective trunnion passage, said flexible conduit sections being of a length to permit the ends thereof connected to said trunnion to rotate with said trunnion upon tilting of said mixing bowl, and supply and return conduit sections disposed wholly in the space between said standard and said mixing bowl, said last named supply conduit section connecting the trunnion supply passage with the upper end of said jacket at one side of said mixing bowl and said last named return conduit section connecting the trunnion return passage with the upper end of said jacket at the opposite side of said mixing bowl.

5. In a dough mixer, a pair of spaced hollow upright standards, a trough shaped mixing bowl between and in spaced relation with respect to said standards, a coolant fluid circulating jacket encompassing the side and bottom walls of said mixing bowl, means for tiltably mounting said mixing bowl including a trunnion rigidly secured to an end wall of said mixing bowl and rotatably mounted in the adjacent standard, coolant fluid supply and return lines for said jacket including supply and return passages extending into said trunnion in parallel radial offset relation with the axis of rotation of said trunnion and opening at one end into said standard, radially extending supply and return ports in said trunnion communicating with the closed ends of said supply and return passages and opening into the space between said standard and said mixing bowl, flexible extensible supply and return conduit sections disposed wholly within said standard, each having at one end a connection with and opening through an exterior wall of said standard and having at the other end a connection with a respective trunnion passage, and inextensible supply and return conduit sections disposed wholly in the space between said standard and said mixing bowl connecting said supply and return ports of said trunnion with said coolant fluid circulating jacket.

References Cited in the file of this patent

UNITED STATES PATENTS

| | | |
|---|---|---|
| 840,602 | Berg | Jan. 8, 1907 |
| 1,775,397 | Jonsson | Sept. 9, 1930 |
| 2,007,288 | Thomson | July 9, 1935 |
| 2,046,685 | Jonsson | July 7, 1936 |
| 2,265,552 | Sticelber | Dec. 9, 1941 |
| 2,274,220 | Sticelber | Feb. 24, 1942 |